Feb. 4, 1941.  G. SUNDBACK  2,230,785

MOLDING METHOD AND APPARATUS

Filed May 28, 1938

INVENTOR.
Gideon Sundback
BY Kelley & Chisholm
ATTORNEYS.

Patented Feb. 4, 1941

2,230,785

UNITED STATES PATENT OFFICE 2,230,785

MOLDING METHOD AND APPARATUS

Gideon Sundback, Meadville, Pa., assignor to Talon, Inc., Meadville, Pa., a corporation of Pennsylvania Application May 28, 1938, Serial No. 210,686

6 Claims. (Cl. 18—30)

My invention relates to molding of a series of closely spaced articles on a carrier and is particularly intended for making slide fastener stringers wherein the fastener elements consist of moldable plastic material.

My improved process involves the injection molding of the fastener elements one by one directly on the tape from a supply of material maintained constantly under pressure.

It is an object of my invention to provide improved method and apparatus wherein the moldable material is cut off intermittently and the pressure released between molding operations to allow easier movement of the mold parts from one mold station to another. In the accompanying drawing, I have shown for purposes of illustration one embodiment which my invention may assume in practice. In the drawing.

Figures 1, 2:
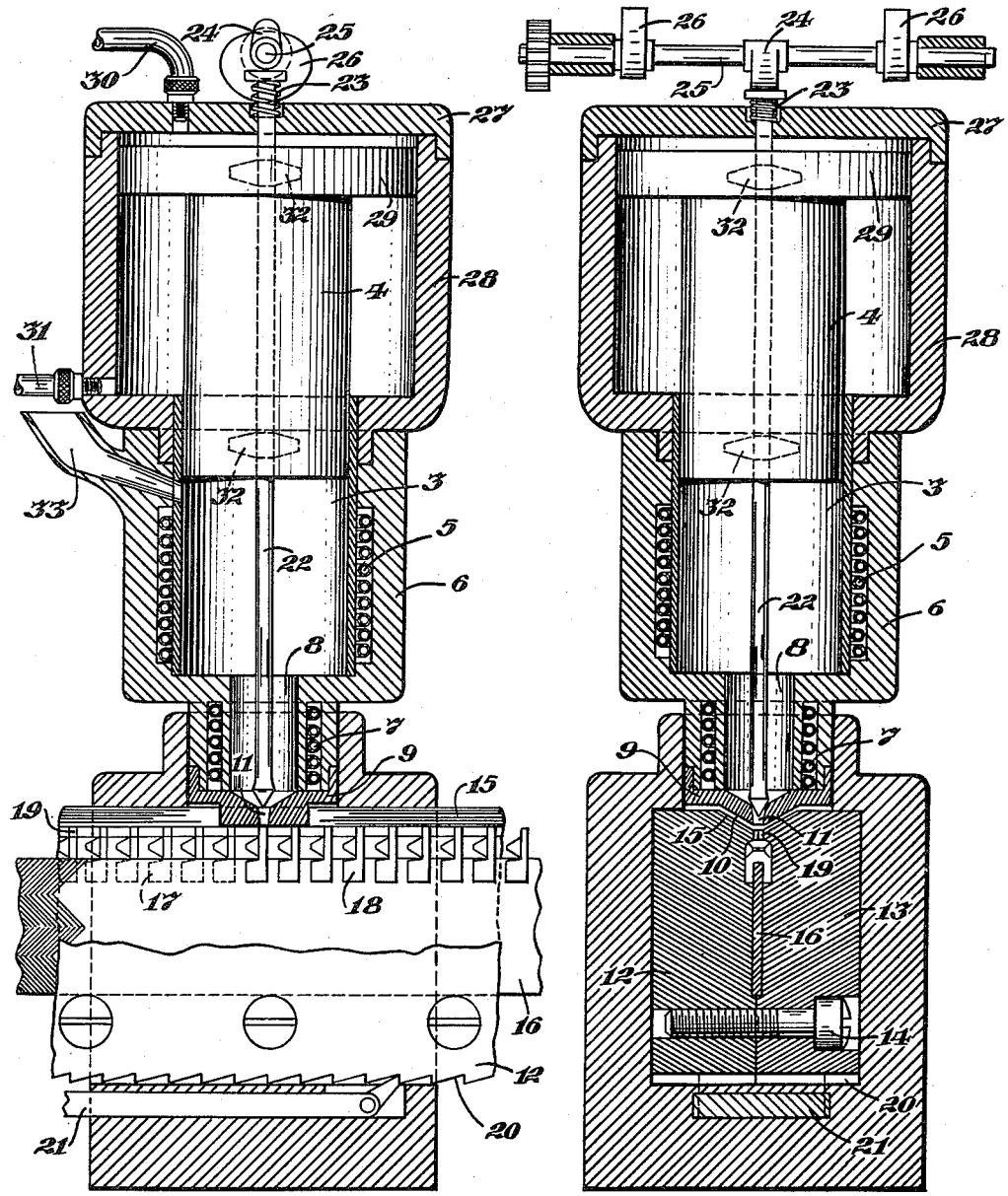
Fig. 1 is a vertical cross-section of my improved molding apparatus.
Fig. 2 is a vertical cross-section taken at right angles to Fig. 1.

The drawing is more or less schematic and certain parts such as the frame are omitted in order to facilitate illustration of the principle of the invention.

The moldable material is contained in a cylinder 3 in which is fitted a piston 4. Electrical heating elements 5 are mounted in the walls 6 of the cylinder 3, and a separately controlled electrical heating element 7 is arranged in an extension 8 of the cylinder, the extension 8 being preferably though not necessarily smaller in diameter than the cylinder 3. A cap 9 is fitted over the extension 8 and has a tapered outer surface 10 and an opening 11 through the center. This nozzle is adapted to make contact with the mold parts 12, 13 which when held together by the screw 14, provide a V-shaped trough 15 into which the nozzle fits. The mold parts are provided with suitable recesses for receiving the flexible carrier or tape 16 and have suitable impressions providing the series of mold cavities 17 for forming the slide fastener elements 18. Each of the cavities 17 communicates through a passage 19 with the V-shaped trough 15 and is adapted to register with the outlet 11. The mold parts are intermittently fed forward in any suitable manner such as by a rack 20 and pawl 21. In this manner the mold cavities are successively brought into communication with the outlet 11 and after such movement the needle valve 22 is lifted by the spring 23 to allow the moldable material to flow into the mold cavities. Suitable mechanism is provided for operating the valve in properly timed relation with the feed movement of the mold chambers. This may include a cam 24 on shaft 25. Another cam 26 may be arranged on the same shaft to push the whole container downwardly to exert mechanical pressure between the nozzle and the mold parts to prevent escape of the material at that point. The cam 26 exerts pressure through the cap 27 and cylinder 28 which may be mounted directly on the cylinder.

A fluid pressure piston 29 is fitted in the cylinder 28 and is mechanically connected to the piston 4 so that when the pressure fluid, such as compressed air, is introduced into the pipe 30, it will act on piston 29 and force the injection piston 4 downwardly, thus maintaining a constant pressure on the moldable material in the cylinder 3. The piston may be lifted when all of the material has been injected by introducing compressed air through the pipe 31. The needle valve extends through the piston 4 and suitable packings 32 are employed to prevent the molding material from leaking past the piston. When the piston 4 is lifted up, the cylinder 3 may be charged through a suitable opening 33.

The material in the cylinder 3 is progressively heated and rendered more plastic as it passes toward the bottom end. Preferably the heat in the upper portion where the bulk of the material is contained, is not high enough to do injury to the material even though it may be left there for a considerable period of time. The lower part of the material chamber 8 is small enough so that it will not contain any great amount of material and can be kept at the proper temperature for molding. In this manner material such as cellulose acetate may be satisfactorily molded and if the machine is shut down for any length of time the charge of material in the cylinder 3 will not be overheated. At the same time, an adequate supply is maintained to carry on a continuous molding operation.

While I have shown and described in this application one embodiment which my invention may assume in practice, it will be understood that this embodiment is merely for the purpose of illustration and description, and that various other forms may be devised within the scope of my invention as set forth in the appended claims.

What I claim as my invention is:

1. The method of making an article which comprises a carrier with a series of molded articles closely spaced on the carrier, comprising maintaining a charge of moldable material constantly under pressure and in moldable condition in a container which has an outlet, and moving past said outlet a mold assembly which has a series of closely spaced non-intercommunicating mold chambers and a carrier, a portion of which projects into each of said mold chambers, successively establishing communication between said container outlet and said mold chambers while the mold chambers are opposite said outlet, and intermittently closing the outlet from the container during movement of the mold while the outlet is passed between mold chambers.

2. The method of making fastener stringers having a flexible carrier and a plurality of fastener elements thereon, which comprises maintaining a charge of moldable material constantly under pressure in moldable condition in a container, placing the flexible carrier between opposed mold parts having a series of mold cavities, successively bringing said cavities into communication with the container and intermittently cutting off such communication between successive molding operations.

3. Apparatus for making fastener stringers of the class described comprising a container having an outlet for moldable material, means for maintaining the material in said container in heated condition and constantly under pressure, said container having an outlet, a valve for intermittently opening and closing the outlet, opposed mold parts having a series of mold cavities, and means for receiving a slide fastener tape with a portion projecting into such cavities, means for guiding said mold parts for successive communication between the mold cavities and the container outlet, and means for intermittently opening and closing said valve to allow moldable material to flow into the mold cavity when in contact therewith but to cut off the flow of material from said outlet during movement of the mold parts.

4. The combination defined in the preceding claim wherein fluid pressure means is employed for exerting constant pressure on the moldable material.

5. The combination defined in claim 3 together with means for maintaining mechanical pressure between the said container and said mold parts during the molding operation and releasing said pressure between molding operations to allow movement of the mold parts.

6. The combination defined in claim 3 wherein the means for maintaining pressure on the moldable material comprises a fluid pressure actuated piston and wherein the valve actuating means extends axially through the piston.

GIDEON SUNDBACK.